United States Patent [19]
Aida

[11] 3,977,682
[45] Aug. 31, 1976

[54] GAME SCORE REPRODUCTION DEVICE FOR INDOOR BOARD GAMES SUCH AS CHESS AND GO

[76] Inventor: Seizaburo Aida, 3-12-25, Kesajiro, Nagaoka, Niigata 940, Japan

[22] Filed: Dec. 17, 1974

[21] Appl. No.: 533,439

[52] U.S. Cl. .......................................... 273/136 A
[51] Int. Cl.² ........................................ A63F 3/00
[58] Field of Search ................... 273/131, 134, 136

[56] References Cited
UNITED STATES PATENTS

| | | | |
|---|---|---|---|
| 3,579,856 | 5/1971 | Way ........................... | 273/136 A X |
| 3,654,392 | 4/1972 | Beinhocker et al. ......... | 273/136 A X |

FOREIGN PATENTS OR APPLICATIONS

| | | | |
|---|---|---|---|
| 7,770 | 1896 | United Kingdom ............. | 273/134 A |

Primary Examiner—Delbert B. Lowe
Attorney, Agent, or Firm—Fred Philpitt

[57] ABSTRACT

A game score reproduction device for indoor games such as chess and go, which enables trainees to study play records of those indoor board games. The reproduction device comprises the following four components: a first component in the form of a recording medium for recording board game scores in an optically reproducible form; a second component in the form of an optical fiber system for illuminating the portions of the game board in accordance with the recorded data on the recording medium; a third component in the form of the light source system for said optical fiber system; and a fourth component in the form of a feed mechanism for feeding the recording medium by the amount corresponding to a unit surface.

3 Claims, 24 Drawing Figures

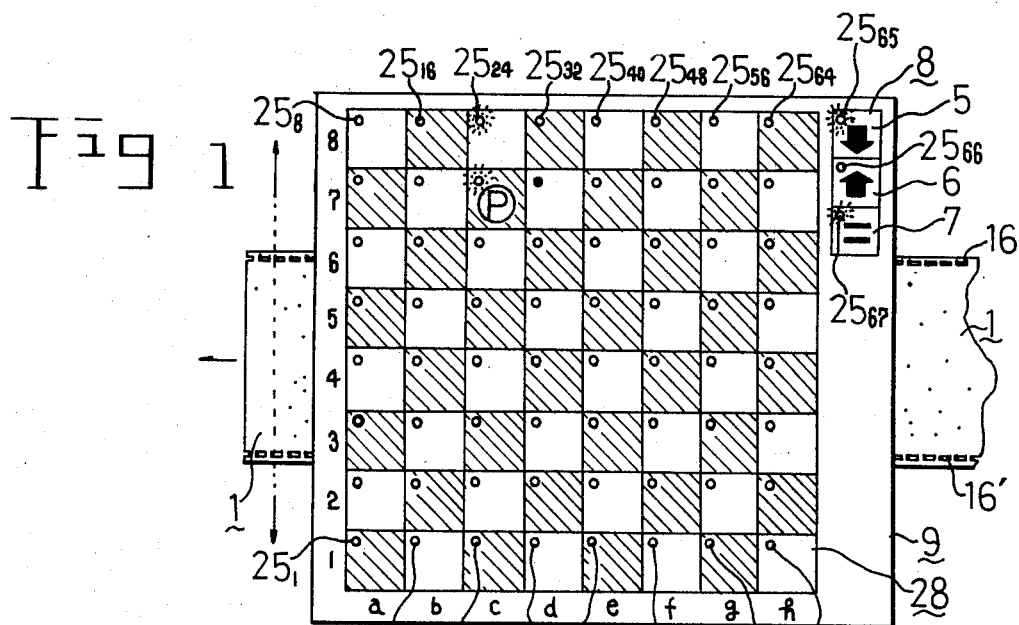
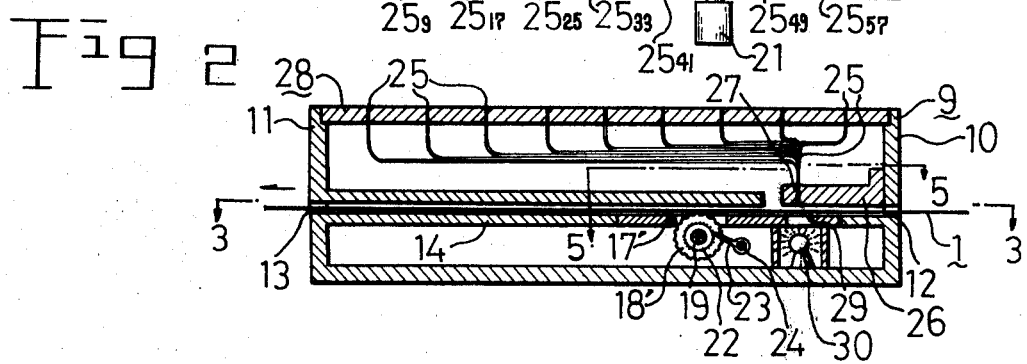
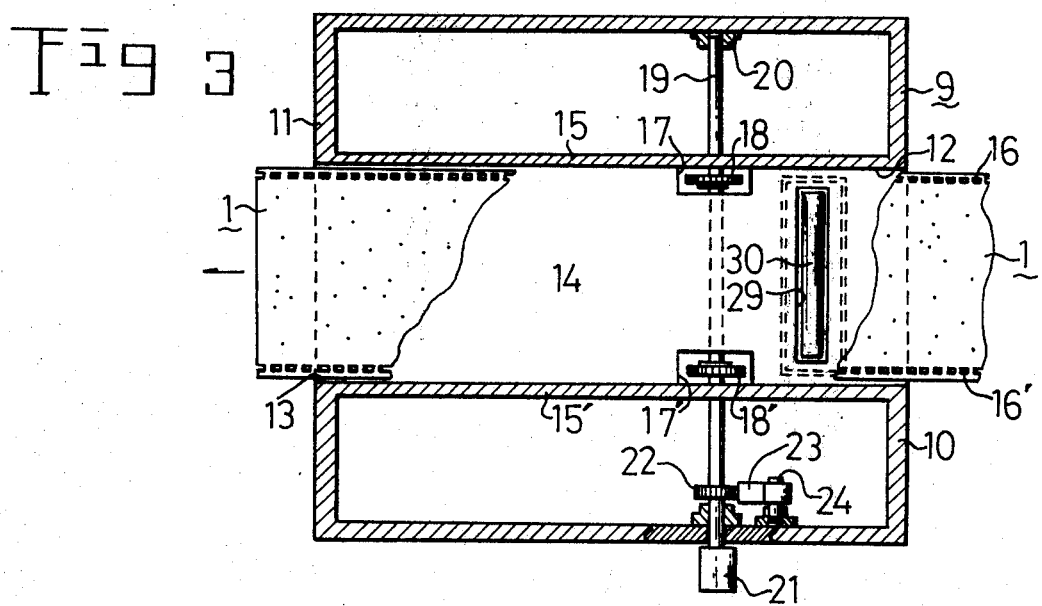

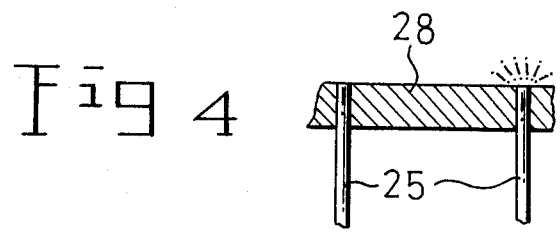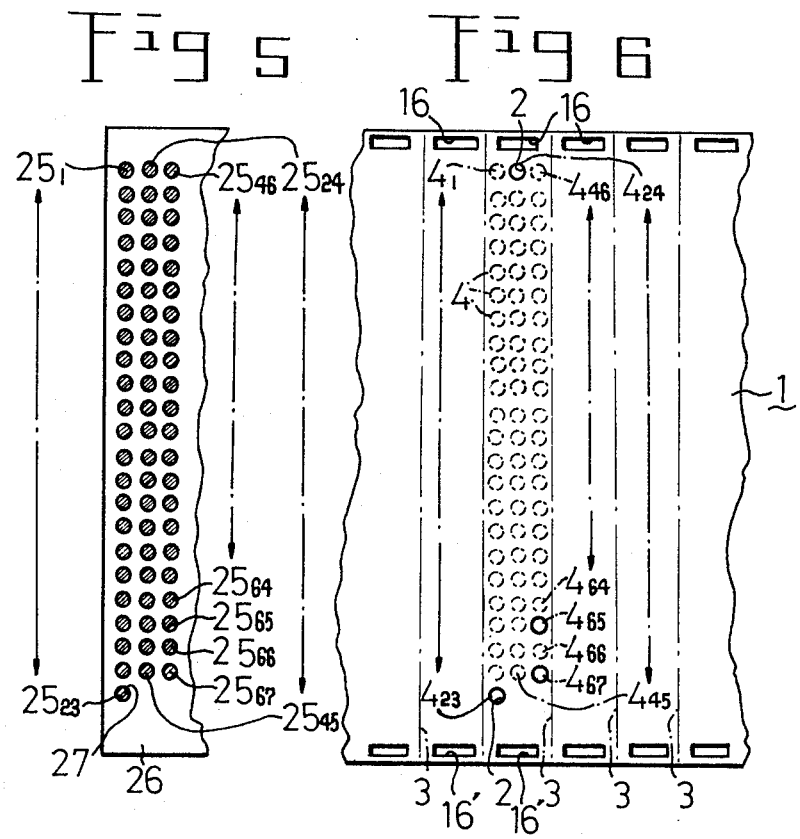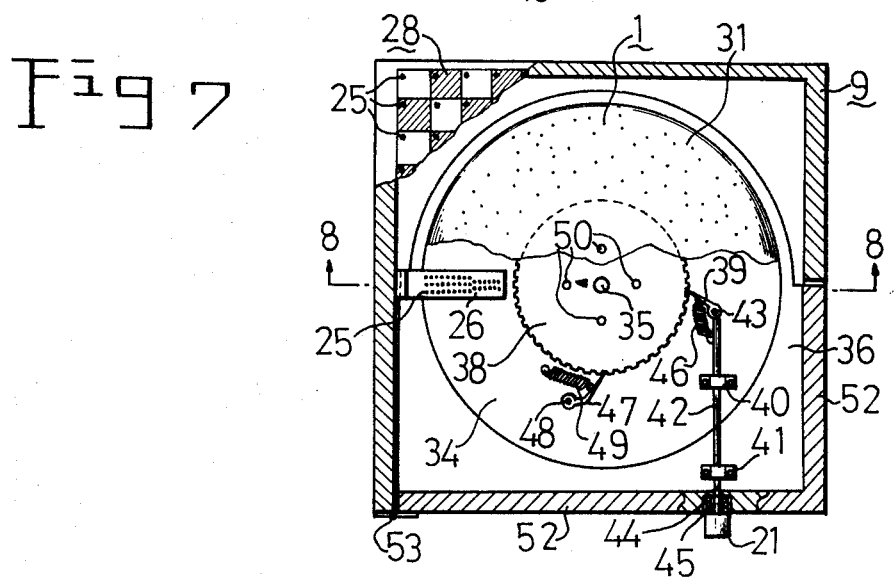

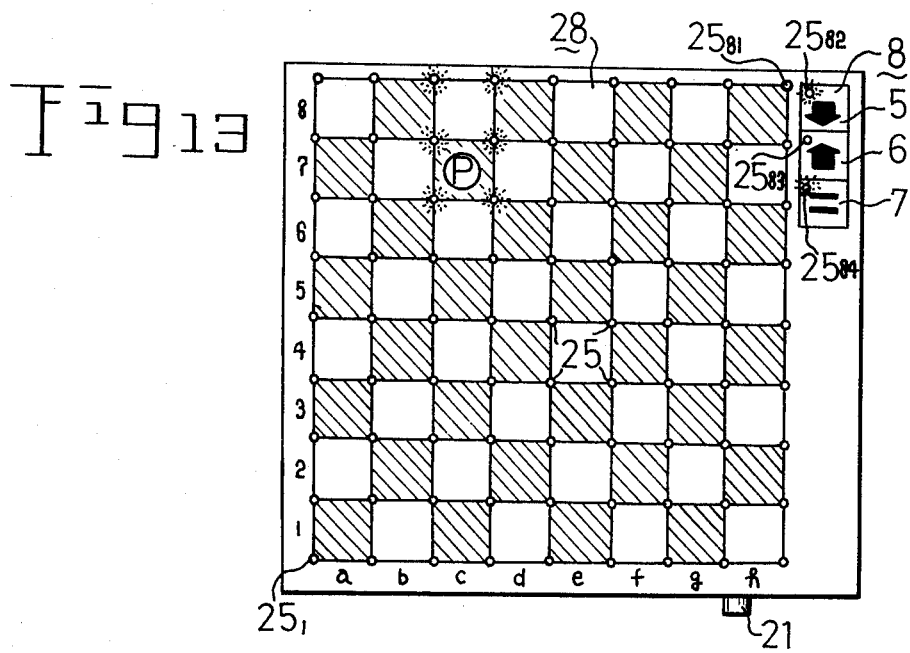
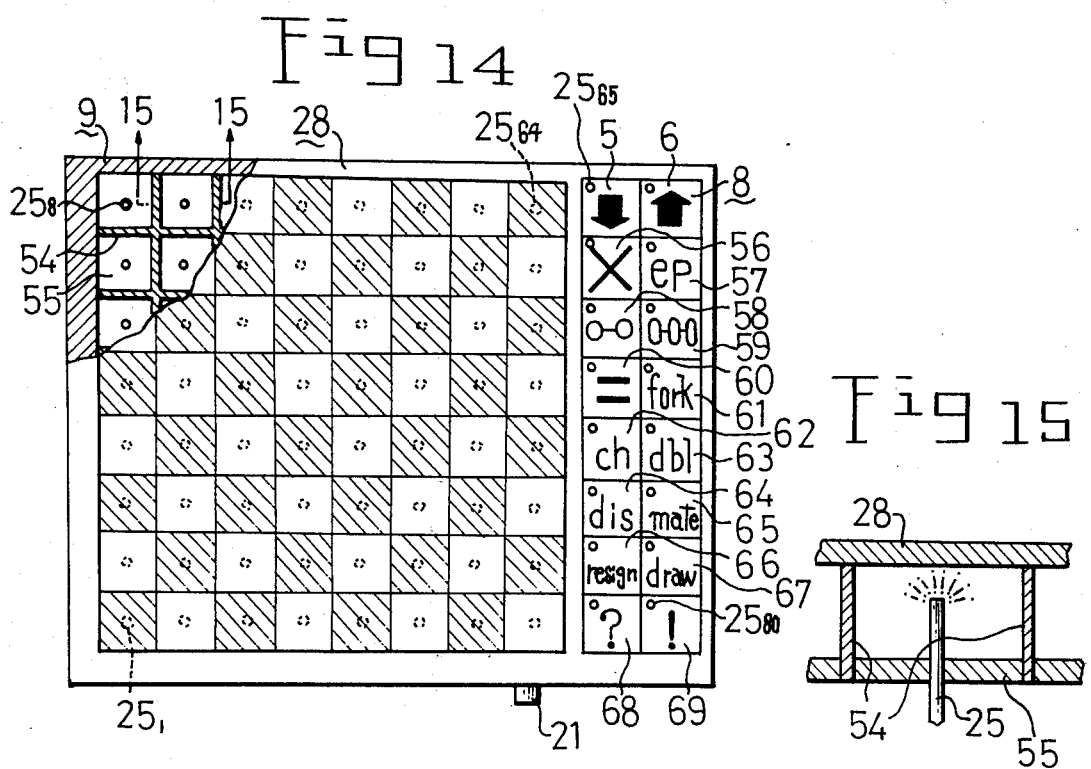

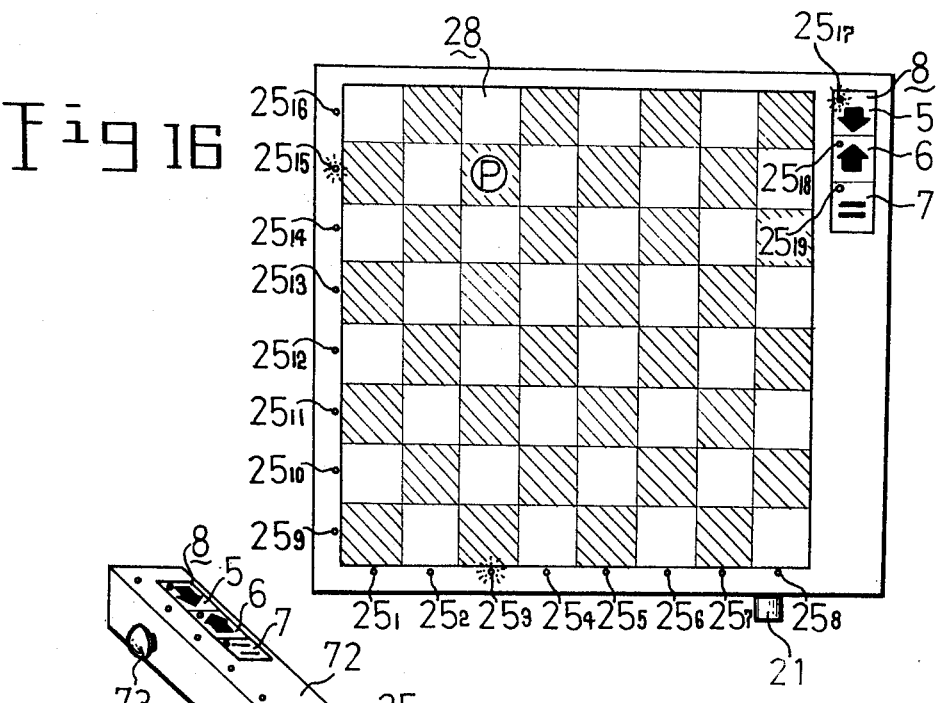
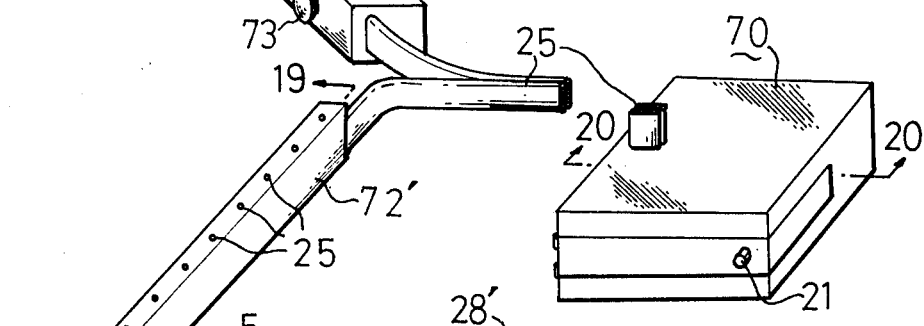
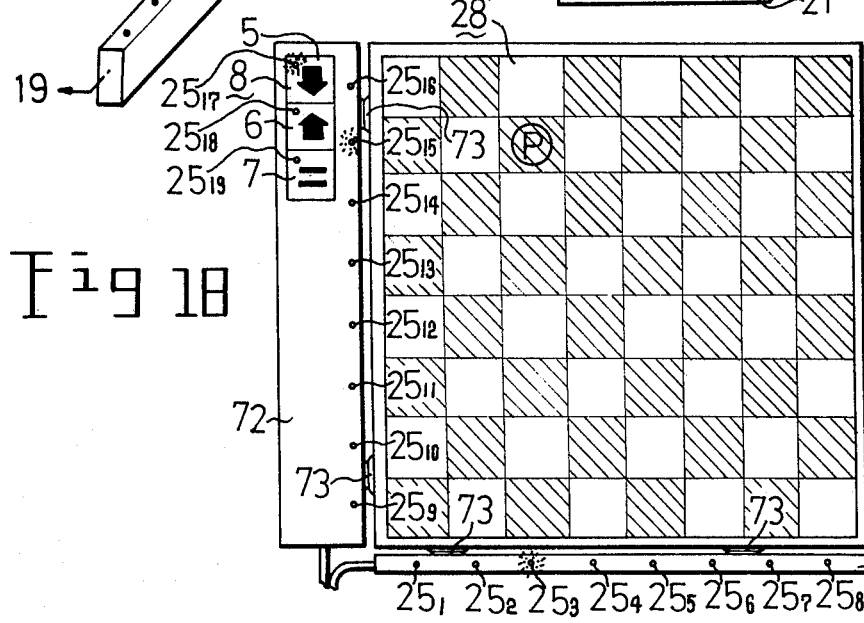

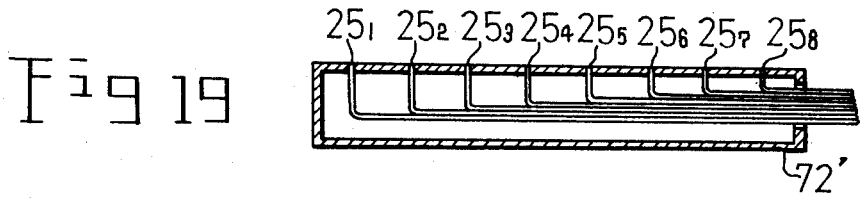
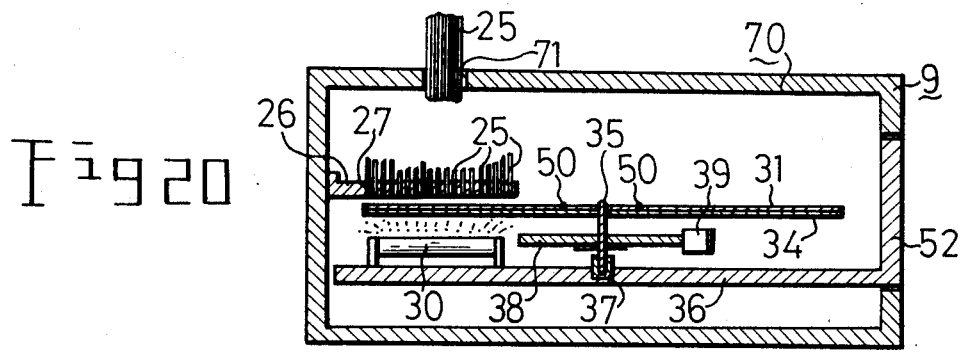
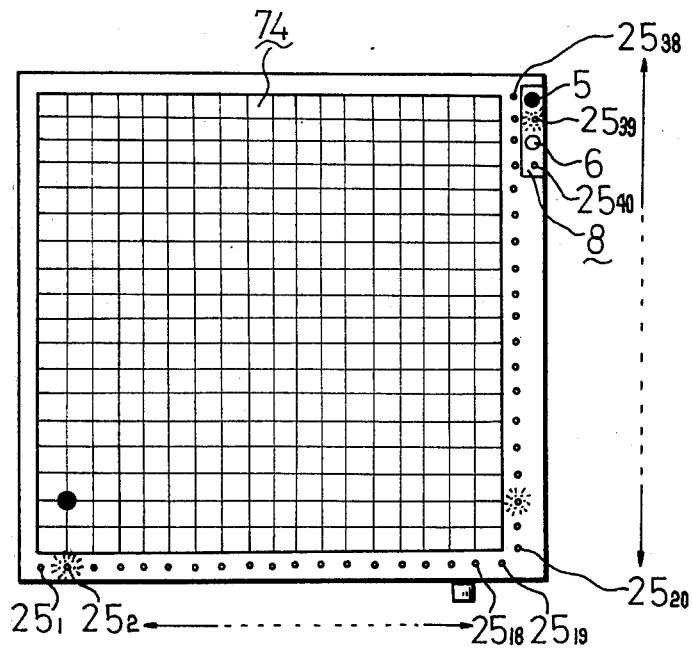

GAME SCORE REPRODUCTION DEVICE FOR INDOOR BOARD GAMES SUCH AS CHESS AND GO

FIELD OF THE INVENTION

The present invention relates to a game score reproduction device for indoor board games such as chess and go, which enables trainees to study play records of those indoor board games easily.

DESCRIPTION OF THE PRIOR ART

As a game score reproduction device for indoor board games such as chess and go, so far an electrically operated device which comprises a recording medium on which game scores are recorded in a form to be reproduced by an electric sensor, and a system of neon lights incorporated in all the display points on the game board for reproducing game scores according to the records on the recording medium, has been proposed.

SUMMARY OF THE INVENTION

The present invention relates to a game score reproduction device for indoor board games such as chess and go. An object of the present invention is to provide a game score reproduction device that is low in failure possibility and is inexpensive through the utilization of optical fibers as the means of display.

BRIEF DESCRIPTION OF THE DRAWINGS

FIG. 1 is a plan view of the chess game score reproduction device that utilizes a recording medium in the form of a long strip;

FIG. 2 is a vertical sectional view of the device shown in FIG. 1 with a portion of the mounting base removed;

FIG. 3 is a horizontal sectional view taken along the line 3—3 in FIG. 2, with a part of the recording medium removed;

FIG. 4 is a portion of a vertical section of the chess board illustrating the top end of an optical fiber bundle;

FIG. 5 is a horizontal sectional view taken along the line 5—5 in FIG. 2, with a portion of the support frame removed;

FIG. 6 is an enlarged view of the recording medium with the right and left end portions removed;

FIG. 7 is a plan view of the chess game score reproduction device that utilizes a recording medium in the form of a circular disc, with a portion of the chess game board removed;

FIG. 13 is a plan view of the chess game score reproduction device in which the top end of each optical fiber bundle is located at an intersection of score lines on the game board;

FIG. 14 is a plan view of the chess game score reproduction device in which the top end of each optical fiber bundle is located underneath a square, with a portion of the chess game board removed;

FIG. 15 is a vertical sectional view taken along the line 15—15 in FIG. 14;

FIG. 16 is a plan view of the chess game score reproduction device in which each top end of the optical fiber bundles is located in the outside margins of the board along the rank and file lines;

FIG. 17 is an oblique view of the chess game score reproduction device in which the units containing the top ends of the optical fiber bundles are led out from the chess board proper, with the middle portions of the optical fiber bundles omitted.

FIG. 18 is a plan view of the chess game score reproduction device shown in FIG. 17 mounted on a chess board, with a portion of the optical fiber bundles omitted;

FIG. 19 is a vertical sectional view taken along the line 19—19 in FIG. 17, with the optical fiber bundles omitted partly;

FIG. 20 is a vertical sectional view taken along the line 20—20 in FIG. 17 with portions of the optical fiber bundles omitted;

FIG. 21 is a plan view of the go game score reproduction device;

DETAILED DESCRIPTION OF PREFERRED EMBODIMENTS

Figure 8:
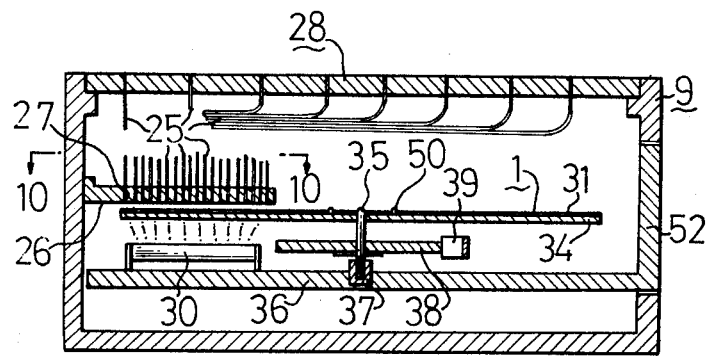
FIG. 8 is a vertical sectional view taken along the line 8—8 in FIG. 7, with middle portions of the optical fiber bundles removed.

The game score reproduction devices for indoor board games such as chess and go according to the present invention comprise the following four major components:

The first component is a recording medium on which records of game scores registered continuously in an optically reproducible form are recorded.

The second component is a system of optical fiber bundles for displaying the types and the moves of game pieces such as chessmen or go stones by means of illumination, whereby these optical fiber bundles have their top ends located where they can indicate the types and the moves of the chessmen or go stones, while they have their lower ends located in the positions corresponding to the respective data record positions on the recording medium.

The third component is a light source installed near the lower ends of the optical fiber bundles underneath the recording medium.

The fourth component is a feeding device for successively feeding the recording medium one unit area at a time.

Now, the embodiments for reproducing chess game scores will be described first and then the embodiments for reproducing go game scores will be described last.

In a chess game, a set of records on the recording medium for one move of a player consists of a data set for a chessman type and its move.

A set of data for chessman type consists of two elements of which one is the distinction whether the chessman belongs to the black side or to the white side, and the other is the designation of the specific chessman type among the 16 chessmen. This chessman type designation can be effected by the indication of the square in which the chessman in question is found.

A set of data for a chessman move consists of two elements of which one is the square into which the chessman is to move, and the other is the option of the player who moved a pawn into a square adjacent the opponent's edge line whether to exchange that pawn for any of the pieces or not. Furthermore, when he decides to exchange the pawn for any of the pieces, another means of indicating the type of piece for which he exchanged the pawn may also become necessary.

All these data described above for indicating the type and move of a moved chessman are recorded on the recording medium 1 in a form can be optically reproduced.

There are two possible methods of recording data on the recording medium 1 in an optically reproducible form. One of them is punching holes in an opaque recording sheet, and the other is to coat all areas of a transparent recording sheet with opaque color or material except the spots corresponding to the recording data.

As the recording medium, two types are shown in the accompanying drawings; one of which being in the form of strips such as long cards and tapes, and the other of which being in the form of circular discs.

In the first place, a chess game score reproduction device that utilizes a data recording medium which consists of a long card or a tape in which data are recorded in the form of punched holes will be described.

As shown in FIG. 6, the long strip of recording medium 1 consists of continuously and uniformly spaced unit areas 3 (areas surrounded by long and short dash lines) along its length.

Each area 3 is large enough to contain 67 punch holes 2. In FIG. 6, 67 imaginary punch hole locations 4 are shown. Data are recorded on the recording medium within one unit area 3 by means of punch holes 2 selectively made among the punch hole locations 4. Among the 67 hole locations in one unit area 3, hole locations marked 4(1) through 4(64) correspond to the squares designated by the file names and the rank names in FIG. 1, i.e., 1-a, 2-a, 3-a through 7-h, 8-h, respectively. In other words, the hole location 4(1) corresponds to the square 1-a, and the hole location 4(2) corresponds to the square 2-a, and so forth.

The punch hole locations 4(65), 4(66) and 4(67) correspond to the display locations 8 located outside the squares, that is, the punch hole location 4(65) corresponds to the indicator 5 for white, the location 4(66) corresponds to the indicator 6 for black, and the location 4(67) corresponds to the indicator 7 for pawn exchanging.

It follows from the foregoing that when white makes a move, as shown in FIG. 1, his pawn is moved from the square 7-c to the square 8-c where he exchanges said pawn for a piece, and this move is recorded by punch holes 2 made in the locations 4(23), 4(24), 4(65), and 4(67). These punch holes 2 are shown in FIG. 6 by solid lines so as to distinguish them from the unpunched locations.

In this way, all the successive moves of the players are recorded move by move on the recording medium to complete a full record of a complete game.

The recording medium 1 is inserted in the device body 9 in the longitudinal direction as shown in FIGS. 2 and 3 and is fed by one unit area at a time to reproduce the play.

The device body 9 is provided with an inlet 12 for the recording medium in one side, and with an outlet 13 in the opposite side. Below the inlet 12 and the outlet 13, the device is provided with a mounting base 14. Therefore, the recording medium introduced through the inlet 12 is made to slide over the mounting base 14 before it is led out through the outlet 13. Because the mounting base is provided with side walls 15 and 15', the recording medium is guided between these two side walls.

The recording medium 1 is provided with one series of feed holes 16 and 16' on each edge thereof, whereby one pair of holes corresponds to one unit area.

On the mounting base 14, at one location in the loci of the feed holes 16 and 16', there is one each window 17 and 17'. There is one each sprocket 18 and 18' for feeding the recording medium forward installed in each of these windows 17 and 17'. These sprockets 18 and 18' are fixedly supported at their centers by the shaft 19, one end of which is rotatably supported by a support bracket 20 fastened to the device body 9, and the other end of which is put through a portion of the device body 9 with a running clearance. The end of the shaft 19 projecting outside is provided with a knob 21. Because the teeth pitch of the sprockets 18 and 18' is nearly equal to the pitch of the feed holes 16 and 16' in the recording medium 1, when the knob 21 is turned, the recording medium 1 can be fed forward.

The shaft 19 carries also a ratchet wheel 22 having the same number of teeth as the sprockets 18 and 18', said ratchet wheel 22 being fastened to said shaft 19 at its portion found inside the device body. There is a pawl 23 installed in engagement with said sprocket wheel 22 from the right upper direction as shown in FIG. 2. As said pawl 23 is swivelably mounted on a support pin 24, said ratchet wheel 22 is only rotatable in the direction of feeding the recording medium forward, and in the opposite direction said ratchet wheel is arrested by said pawl 23. It follows therefore that the knob 21 can be turned only in the direction of feeding the recording medium forward, and that when it is turned, there is a definite articulation corresponding to the pitch of the sprockets 18 and 18'. Thus, when the knob 21 is turned intermittently one pitch of the sprockets 18 and 18' at a time, the recording medium is fed forward one unit area at a time.

Above the mounting base 14 where the recording medium is brought to rest one unit area after another, there are brought all the lower ends of the optical fiber bundles 25. As shown in FIGS. 2 and 5, these lower ends of the optical fiber bundles 25 are led through the holes 27 opened through the support frame 26 and fastened thereto while said support frame 26 is fastened to the device body 9. There are as many optical fiber bundles 25 as the number of imaginary punch hole locations 4 within one unit area on the recording medium, this number being 67, and each of the lower ends of these 67 optical fiber bundles is located in one to one corresponding location with each of the imaginary punch hole locations 4 directly thereabove. Thus, the optical fiber bundles 25(1) through 25(64) have their lower ends respectively directly above the corresponding punch hole locations 4(1) through 4(64), and the optical fiber bundles 25(65), 25(66) and 25(67) are located respectively directly above the punch hole locations 4(65), 4(66) and 4(67). All these optical fiber bundles 25 are brought through the chess board 28 and their top ends are brought flush with the top surface of the chess board, as shown in FIG. 4. Each top end of the optical fiber bundles is brought to each location on the chess board (square or indicators 8) designated by the respective punch hole location 4 directly above which the lower end of the optical fiber bundle in question is located. Thus, the upper ends of the optical fiber bundles 25(1) through 25(64) are brought into the squares 1-a through 8-h respectively on the chess board 28, and the upper ends of the optical fiber bundles 25(65), 25(66) and 25(67) are brought to the indicator 5 for white, indicator 6 for black and the indicator 7 for chessman exchange respectively in the display section 8.

In the mounting base 14, there are as many windows 29 opened as there are optical fiber bundles 25, their locations corresponding to the locations of the lower ends of these optical fiber bundles 25, and all these windows are illuminated from below by a suitable light source such as the fluorescent lamp 30. It follows, therefore, that those optical fiber bundles 25 corresponding to the punched holes 2 in the recording medium 1 appear bright at their top ends. Thus, for example, when four punch hole locations 4(23), 4(24), 4(65), and 4(67) among the 67 punch hole locations 4 are actually punched to open the holes 2 as shown in FIG. 6, then, the top ends of the optical fiber bundles 25(23), 25(24), 25(65) and 25(67) located respectively in the square 7-c, square 8-c, the white indicator 5, and the chessman exchange indicator 7 appear bright. Now the trainee is able to reproduce the game score by moving the pawn originally located in the square 7-c to the square 8-c where it is exchanged with a piece.

When the know 21 is turned, the recording medium 1 is fed forward to the next unit area 3 and the next chessman as well as its move is indicated by illuminated top ends of optical fiber bundles, and so forth, whereby when the trainee moves chessmen in accordance with the series of illuminated indications, the complete chess game is reproduced.

Secondly, we will describe the game score reproduction device that utilizes a recording medium 1 in the form of a circular disc 31.

Figure 11:
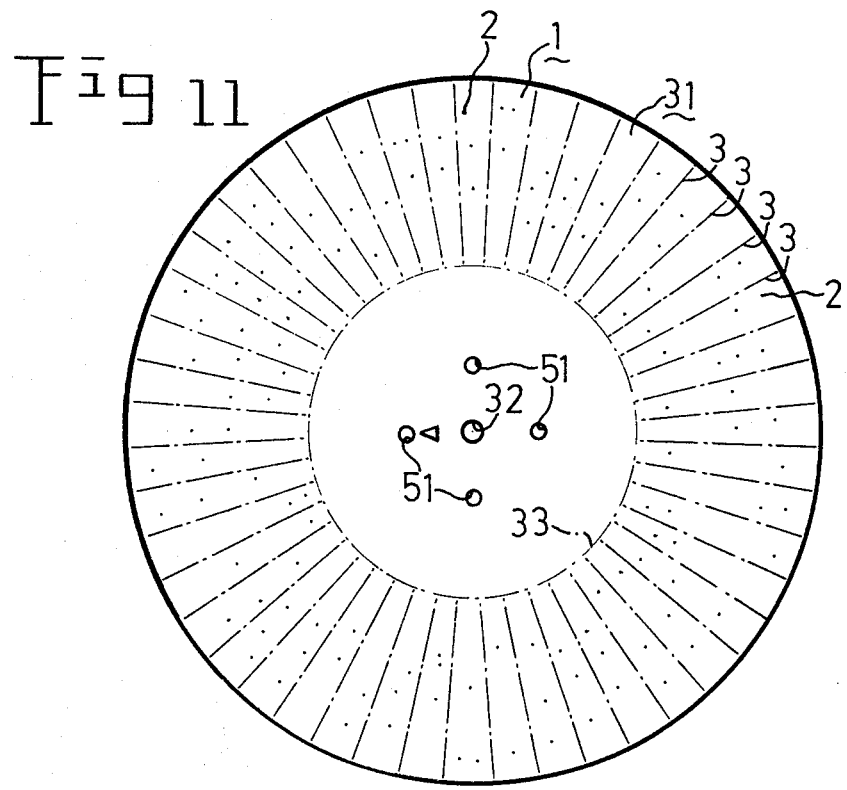
FIG. 11 is a plan view of the circular disc recording medium.

As shown in FIG. 11, the circular recording medium 1 is divided into a plurality of unit areas 3 located outside an imaginary circle 33 described around the center hole 32 with a predetermined radius forming sector shapes around the center hole 32.

Figure 12:
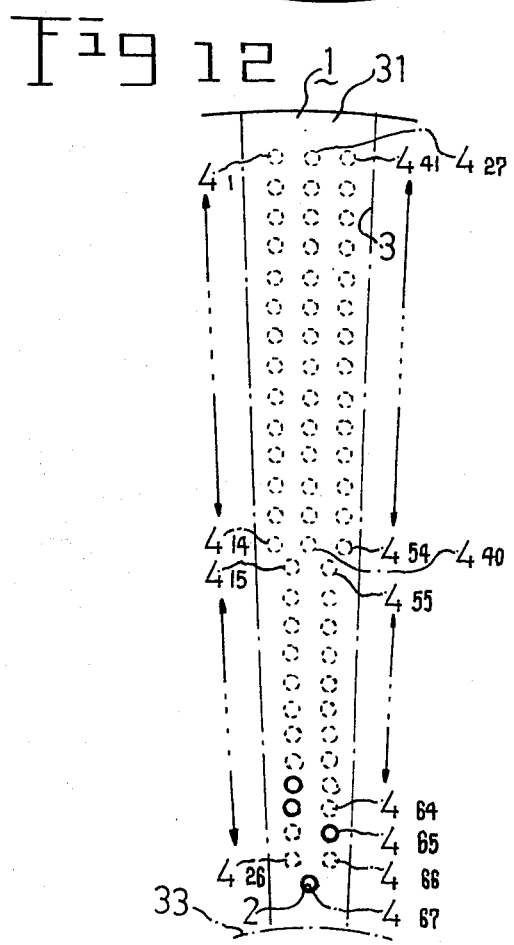
FIG. 12 is an enlarged view showing a unit display area of the recording medium shown in FIG. 11.

Said unit areas 3 are formed continuously along the imaginary circle 33, each sector-shaped area 3 having the same angle around the circle 33. As shown in FIG. 12, each unit area 3 contains imaginary punch hole locations 4(1) through 4(67). Although these unit areas 3 are in the form of a sector with their width becoming narrower towards the center of the disc, and imaginary punch hole locations 4 are arrayed on these unit areas 3 somewhat differently from the corresponding array on the previous rectangular unit area 3, they indicate the same squares on the chess board and the same indicators in the display section 8.

Figure 9:
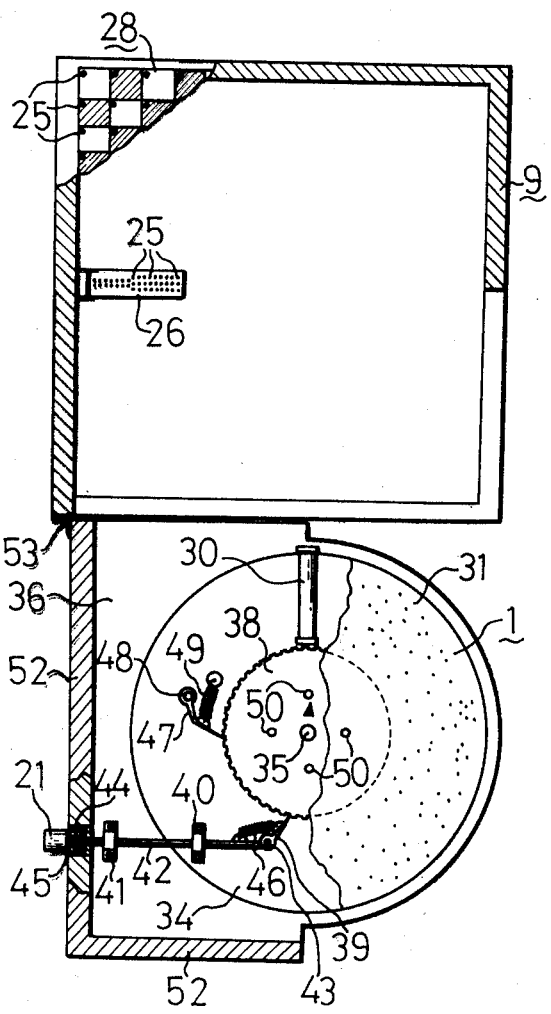
FIG. 9 is a view similar to FIG. 7 but the transparent turntable is shown extracted to the outside.
Figure 10:
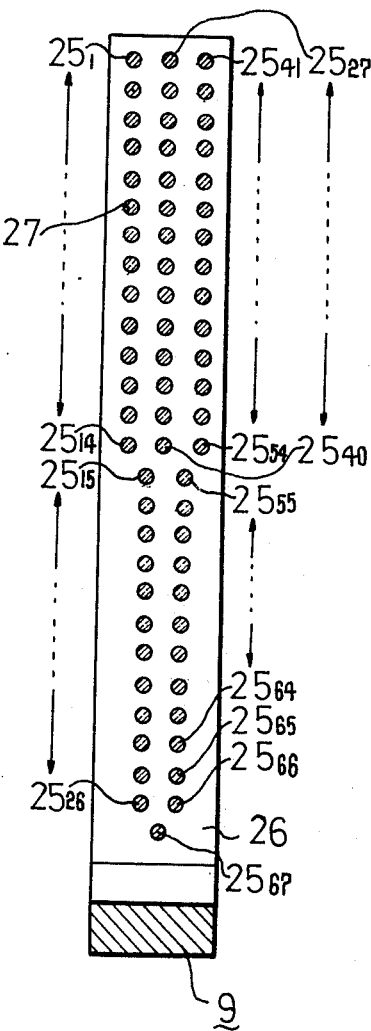
FIG. 10 is a horizontal sectional view taken along the line 10—10 in FIG. 8.

The circular recording medium 1 mentioned above is used in the device in its operating position on a transparent circular turntable 34 as shown in FIGS. 7, 8, and 9. Said circular turntable 34 made of transparent material has a centrally located axle shaft 35 fastened to the turntable, and is supported horizontally by said axle shaft 35. Because this axle shaft 35 is swivelably supported in the bearing 37 fastened to the base plate 36, said transparent turntable 34 is freely turnable in its horizontal position. Said axle shaft 35 carries on it a ratchet wheel 38 fastened at the lower portion of shaft 35 underneath the transparent turntable 34, said ratchet wheel 38 having the same number of teeth as the number of unit areas 3 on the circular recording medium 1. At one position around the circumference of the ratchet wheel 38, there is a feed pawl 39 brought in engagement with said ratchet wheel 38, said feed pawl 39 being swivelably mounted by means of a pin 43 at the end of a drive rod 42 that is supported by support brackets 40 and 41 with a freedom of longitudinal sliding motion in the horizontal direction. The other end of the drive rod 42 projects out through a side plate 52 of the device body 9 through a hole therein having a sufficient size to allow sliding motion of said drive rod 42, and a knob 21 is fastened to this end. On the outside of the side plate 52, around the hole for leading the drive rod 42, there is a counterbore 44 for receiving a spring 45 installed around said drive rod 42, said spring 45 normally forcing said knob 21 outwardly.

There is a spring 46 so installed between the feed pawl 39 and the drive rod 42 that the tip of the feed pawl 39 is always pulled towards the ratchet wheel 38 into engagement therewith. In this arrangement, when the knob 21 is pushed in the direction of the ratchet wheel 38, the ratchet wheel 38 is turned by the pawl 39. The depth of the spring recess 44 and the length of the spring 45 are so adjusted that the full stroke of the knob 21 corresponds to one pitch of the ratchet wheel teeth.

At another position around the ratchet wheel 38, there is a pawl 47 swivelably mounted in engagement with said ratchet wheel 38 on a support pin 48. This pawl 47 is so pulled by a spring 49 (one end of which is fastened to the base plate 36) that it is brought in engagement with the ratchet wheel 38 in a manner to allow it a turning freedom only in the direction of the feed motion effected by said feed pawl 39.

In the arrangement described above, when the knob 21 is fully pushed home, the ratchet wheel 38 is driven by one tooth, and then when the knob 21 is released, because the pawl 47 prevents the ratchet 38 from turning backward, the feed pawl 39 returns to its original position without causing the ratchet wheel 38 to turn backward. Thus, when the knob 21 is repeatedly pushed, the ratchet wheel 38 is intermittently driven and the turntable 34 is intermittently driven through one unit area on the recording medium 1 at a time.

Because the recording medium 1 is mounted on said turntable 34 with its center hole 32 put around the axle shaft 35 of the turntable 34, and with a window 51 in the recording medium 1 put over a pin 50 on the top surface of the turntable 34, when said knob 21 is repeatedly pushed, the recording medium 1 is intermittently driven rotation through one unit area 3 at a time.

A group of optical fiber bundles 25 is fastened at the lower end to a support frame 26 fastened at its base to the device body 9 as shown in FIG. 8 with the individual optical fiber bundles put through the respective windows 27 opened in said support frame 26, and the lower ends of these optical fiber bundles brought to positions immediately above the position where the unit areas on the recording medium 1 are brought to rest one after another. There are as many optical fiber bundles as there are punch hole locations 4 on the recording medium 1, that is 67 in total, and their lower ends are all located immediately above respective punch hole locations 4, similar to the arrangement in the previously described game score reproduction device. The top ends of these optical fiber bundles 25 are also brought into the respective squares and the display section 8 that correspond to the respective punch hole locations 4 found directly below the lower ends of these respective optical fiber bundles 25.

Below the turntable 34, just underneath the group of the lower ends of the optical fiber bundles 25, there is a light source such as a fluorescent lamp 30 installed on the base plate 36. Thus, when the knob 21 is repeatedly pushed, the squares on the chess board and the indicators in the display section are selectively illuminated so as to enable the trainee to reproduce the intended chess game scores.

Because the side plate 52 forming an integral unit with the base plate 36 is hinge mounted at one edge to the device body 9, as shown in FIG. 9, the base plate 36 can be swiveled outwards around the hinge 53. Circular recording mediums 1 are to be mounted on the turntable 34 while the base plate 36 is swiveled outwards in this manner.

Thirdly, another embodiment of the board score reproduction device wherein the optical fiber bundles have their top ends in positions different from the positions in the previous embodiments, resulting in a different display effect, will be described.

In FIG. 14, the chess board 28 is made of a translucent material, and the top ends of the optical fiber bundles 25 are located inside their respective squares and respective indicators in the display section 8 below this translucent board. All the squares in the chess board and all the indicators in the display section 8 are separated by frames 54 which are fastened at the bottom to the support plate 55. The respective top ends of the optical fiber bundles 25 are put through the support plate 55 and are brought into their respective spaces underneath the translucent chess board 28. Therefore, when selected optical fiber bundles 25 are illuminated, the squares or indicators containing the illuminated optical fiber bundles become bright uniformly throughout the entire surface of these individual squares. This improvement, resulting in the uniform illumination of the entire surface of illuminated squares, is advantageous over the earlier embodiments because in the earlier embodiments if a chessman happens to be positioned on the top end of an illuminated optical fiber bundle, the trainee is unable to recognize the illuminated optical fiber bundle, whereas in the improved game score reproduction device, this shortening is eliminated by the uniform illumination of the entire square surface.

In still another embodiment shown in FIG. 14, trainees' learning process is facilitated by the use of more indicators in addition to the indicator 5 for white's move, the indicator 6 for black's move, and the indicator 60 for pawn exchanging. These additional indicators are: an indicator 56 for capture, indicator CP for captures in passing, indicator 58 for king rook castling movement, indicator 59 for queen rook castling movement, indicator 61 for fork, indicator 62 for check, indicator 63 for double check, indicator 64 for out of check, indicator 65 for checkmate, indicator 66 for resignation, indicator 67 for draw, indicator 68 for bad move, and indicator 69 for good move. In this latter embodiment there are 16 indicators in the display section 8 because there are 13 additional indicators besides the three indicators in the previous game score reproduction device. In correspondence to the increased number of indicators, there are a corresponding number of additional punch hole locations 4 on the recording medium and also a corresponding number of additional optical fiber bundles 25 to enable game score reproduction involving these additional indicators.

In the chess board of the game score reproduction device shown in FIG. 13, the top ends of individual optical fiber bundles are brought to the respective intersections of the file lines and the rank lines that form the chess squares on the board. In this way, there are 81 optical fiber bundles 25 required for the chess board square indication and with the three additional optical fiber bundles for the display section 8, the total number of optical fiber bundles is 84 in this embodiment. Accordingly, in this chess board, any square is indicated by the illumination of four optical fiber bundles surrounding it as shown in FIG. 13. The display as shown in FIG. 13 indicates that a pawn found at the square 7-c on the white side is to be moved to the square 8-c and to be exchanged for a piece.

FIG. 16 shows a chess score reproduction device wherein optical fiber bundles 25 have their top ends aligned along the two edges of the chess board with one optical fiber bundle corresponding to each of the eight ranks and each of the eight files. In this game score reproduction device, there are 16 optical fiber bundles 25 for the chess board and three for the display section 8, totalling 19. Accordingly, each unit area in the recording medium is provided with 19 punch hole locations 4. In this arrangement, any desired square on the chess board is to be indicated by two simultaneous indications of the rank and the file of the square in question. Thus in FIG. 16, when one optical fiber bundle 25(3) among the ones 25(1) through 25(8) designating respective files is illuminated and another one 25(15) among the ones 25(9) through 25(16) designating respective ranks are illuminated together with the optical fiber bundle 25(17) in the display section for white's move, the pawn found in the square 7-c is to be moved by white. Then, it there is a destination square for the pawn to be moved registered in the next unit area 3 on the recording medium, when the recording medium is fed by one unit area by means of the knob 21, the recorded destination square is indicated. This means, in the above chess score reproduction device, for one move of a player at least two unit areas 3 are required and at least two motions of the knob 21 are required.

Figure 22:
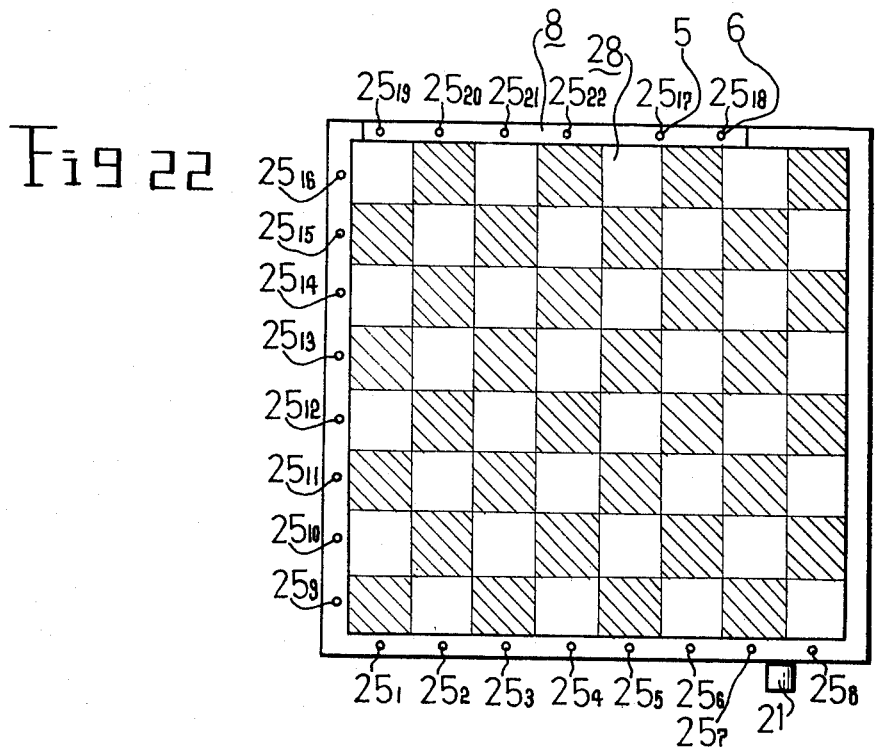
FIG. 22 is a plan view of the chess game score reproduction device in which chess piece upgrading is indicatable.

In still another chess score reproduction device shown in FIG. 22, there are four more indicators 25(19) through 25(22) provided in the display section for indicating for what piece a pawn is exchanged. Thus, the optical fiber bundle 25(19) is positioned next to the rook, the bundle 25(20) is next to the knight, the bundle 25(21) is next to the bishop, and the bundle 25(22) is next to the queen, indicating, for example, when the optical fiber bundle 25(22) becomes illuminated, that the pawn is exchanged for the queen. Two more indicators 5 and 6 respectively are connected to the top ends of optical fiber bundles 25(17) and 25(18) and are painted in different colors to indicate white and black respectively. In this embodiment, there are 22 optical fiber bundles employed, and accordingly there are 22 punch hole locations 4 on one unit area on the recording medium.

Figure 23:
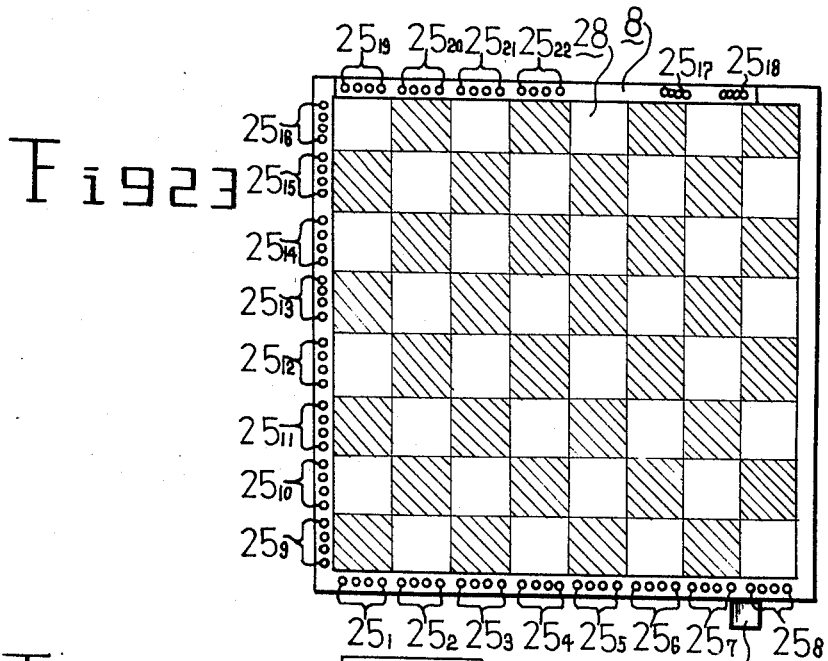
FIG. 23 is a plan view of the chess game score reproduction device in which the bundle of optical fibers for each light display point is formed of several sub-bundles.
Figure 24:
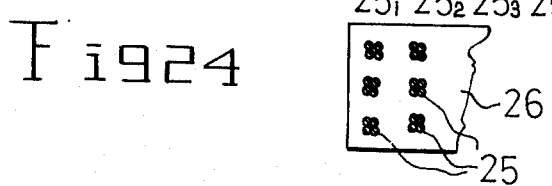
FIG. 24 is a horizontal sectional view showing the method of fastening the optical fiber bundles to the support frame in the chess game score reproduction device shown in FIG. 23.

In the chess score reproduction device shown in FIG. 23, the hitherto described individual optical fiber bundles 25 are divided into several sub-bundles, and the top ends of these sub-bundles forming each bundle are arrayed in the form of a line having an appropriate length to indicate the intended file or rank, while the lower ends of these sub-bundles forming each bundle are bundled together as shown in FIG. 24 and fastened to the support frame 26. Because in this chess score reproduction device each optical fiber bundle is arrayed in the form of a line having an appropriate length where it is illuminated, rank and file indications are easily recognized by the trainee.

The embodiment shown in FIGS. 17 and 18 is built without a special chess board 28 so that the reproduction device similar to that shown in FIG. 17 is easily mountable on any conventional chess board and is operated. As shown in FIG. 20, this chess score reproduction device comprises a device body 70 having a top window 71 through which a bunch of optical fiber bundles 25 fiburcated into two groups of which one group is for indicating files and the other group is for indicating ranks and indicators in the display section are led out to a case 72 and a case 72' into which said bunch of optical fiber bundles 25 enters after being fiburcated, whereby the top ends of individual optical fiber bundles are brought to the respective indicating positions on the top surfaces of the cases 72 and 72'. These cases 72 and 72' are provided with suction cups at the rectangularly adjacent inner sides by means of which the cases 72 and 72' can be easily installed on any conventional chess board 28'. When the cases 72 and 72' are installed on a conventional chess board 28' as shown in FIG. 18, the respective top ends of the optical fiber bundles 25 are positioned where they are adapted to indicate respective files and ranks of the chess board 28' and the indicators 5, 6 and 7 for white, black and exchange respectively in the display section 8 are also appropriately positioned. Thus, as shown in FIG. 18, when the optical fiber bundles 25(3), 25(15) and 25(17) are illuminated, this is an indication that a pawn found in the square 7-3 is the white's chessman to be moved next.

These cases 72 and 72' may be mounted by any convenient means other than said suction cup means 73, such as adhesive tapes, onto conventional chess boards. The chess score reproduction device last mentioned is advantageous in that the chess board with which the trainee is most familiar can be used to reproduce a desired game procedure.

Now, a game score reproduction device for "go" games will be described below.

In a go game, as shown in FIG. 21, the first and the second players place their black and white stones alternately on respective intersections of vertical lines and horizontal lines on the game board 74. In the go game score reproduction device, each move of the players is recorded on the recording medium 1 as a set of data which consists of the type of the moved stone and the motion of this stone. There are two types of stones, that is, black and white, representing the first and the second players respectively. Motions of stones are indicated by the specific intersection to which the moved stone is to be moved. Although the go score reproduction device according to the present invention is similar to those chess score reproduction devices described so far in the general structure, respective top ends of the optical fiber bundles 25 are positioned at the ends of all the vertical and horizontal lines as well as in the display section 8 on the go game board so as to be able to indicate the intended vertical line and the horizontal line for the purpose of designating their intersection as the destination of the moved stone. There are 38 separate optical fiber bundles 25, that is, 25(1) through 25(19), and 25(20) through 25(38), respectively corresponding to the 19 vertical lines and 19 horizontal lines as well as two optical fiber bundles in the display section 8, that is, the optical fiber bundle 25(39) for indicator 5 designating black, and the optical fiber bundle 25(40) for indicator 6 for designating white. Thus, there are 40 optical fiber bundles in total. Accordingly, in each unit area 3 on the recording medium 1, there are 40 punch hole locations 4, 4(1) through 4(40). In this go score reproduction device, for example, when the optical fiber bundles 25(2), 25(22), and 25(39) are illuminated as shown in FIG. 21, the trainee places a black stone on the intersection between the second vertical line from the left and the third horizontal line from the bottom to reproduce the score. In this way, when a recording medium in which a series of game scores are recorded is used, all the moves of the game are reproduced move by move. In this go score reproduction device, the optical fiber bundle units including the optical fiber bundles 25(1) through 25(19) for designating vertical lines, optical fiber bundles 25(20) through 25(38) for designating horizontal lines, and two more optical fiber bundles 25(39) and 25(40) respectively for indicator 5 designating black and for indicator 6 designating white may also be separated from the device body 70 and installed in cases easily mountable on any ordinary go board, as in the case of the earlier-mentioned chess score reproduction device.

What is claimed is:
1. A game score reproduction device comprising a housing with a board member adapted to receive selective game pieces, the board member having recorded on its surface a predetermined game pattern;

a display section positioned adjacent the game pattern;

a recording medium divided into a plurality of unit sections each having an identical area, on which a continuous record of game score is recorded one unit section after another in a form that allows optical reading;

a plurality of optical fiber bundles all having their respective top ends located in the game board surface where these top ends can serve to indicate the types and motions of said game pieces by selective lighting, and also all having their respective lower ends located in confrontation with respective recording points on said medium, each of which points corresponding to one of said top end locations in the game board surface;

a light source located across the recording medium from the area in which all the lower ends of the optical fiber bundles are grouped, and a feed mechanism for feeding the recording medium one section at a time past said area in which all the lower ends of the optical fiber bundles are grouped, whereby those optical fiber bundles which are specified by the recording on the recording medium become bright at their top ends to indicate the types of game pieces and their motions, and wherein said recording medium has recorded thereon the types and motions of game pieces such as chessmen in a game score by specifying the ranks and files in which intended squares belong, and indicators in the display section; and the top ends of said plurality of optical fiber bundles serve to indicate the ranks and files, and indicators in the display section.

2. A game score reproduction device according to claim 1, wherein said plurality of optical fiber bundles are composed of a plurality of sub-bundles.

3. A game score reproduction device according to claim 1, wherein said plurality of optical fiber bundles have their upper end portions extended out of the reproduction device body, bifurcated into two sub-groups of which one contains only the optical fiber bundles for indicating the files on the game board and the other contains the optical fiber bundles for indicating the ranks on the game board and indicators in the display section, and each sub-group is led into a separate case; and furthermore said cases are not only provided with an attaching and removing means adapted to attach and remove said cases onto and from the game board but also carry all the top ends of all the optical fiber bundles arrayed in such a manner that these top ends can specify respective files and ranks of said game board as well as the indicators in the display section on one of said cases.

* * * * *